US007757051B2

(12) United States Patent  (10) Patent No.: US 7,757,051 B2
Tran et al.  (45) Date of Patent: Jul. 13, 2010

(54) DYNAMIC MEMORY RECONFIGURATION FOR SIGNAL PROCESSING

(75) Inventors: Sang Van Tran, Encinitas, CA (US); Kenneth L. Welch, Alpine, CA (US)

(73) Assignee: Broadcom Corporation, Irvine, CA (US)

(*) Notice: Subject to any disclaimer, the term of this patent is extended or adjusted under 35 U.S.C. 154(b) by 1755 days.

(21) Appl. No.: 10/850,266

(22) Filed: May 20, 2004

(65) Prior Publication Data

US 2005/0262287 A1 Nov. 24, 2005

(51) Int. Cl.
G06F 12/06 (2006.01)

(52) U.S. Cl. .................. 711/154; 711/170; 711/120

(58) Field of Classification Search ............... 711/154, 711/120, 118, 170, 207, 208; 709/214
See application file for complete search history.

(56) References Cited

U.S. PATENT DOCUMENTS

| 3,210,476 | A | | 10/1965 | Shaer | |
|---|---|---|---|---|---|
| 5,631,904 | A | | 5/1997 | Fitser et al. | |
| 6,246,802 | B1 | * | 6/2001 | Fujihara et al. | 382/276 |
| 6,297,754 | B1 | * | 10/2001 | Miyasaka et al. | 341/65 |
| 7,509,391 | B1 | * | 3/2009 | Chauvel et al. | 709/214 |

FOREIGN PATENT DOCUMENTS

| CA | 2311897 | 12/2001 |
|---|---|---|
| WO | WO 97/26748 | 7/1997 |
| WO | WO 01/47224 | 6/2001 |

OTHER PUBLICATIONS

European Search Report corresponding to European Patent Application Serial No. 05026623.8-2414, dated Mar. 23, 2009.

* cited by examiner

*Primary Examiner*—Pierre-Michel Bataille
(74) *Attorney, Agent, or Firm*—McAndrews, Held & Malloy, Ltd.

(57) ABSTRACT

A system and method for processing data (e.g., encoded audio data in an audio decoder). Various aspects of the present invention may comprise a first memory module comprising a first software module and a second software module. A signal-processing module may comprise a processor and local memory. A first data segment may be received, and the processor may identify the first software module for processing the first data segment. The first software module may be transferred to the local memory and executed by the processor to process the first data segment. A second data segment may be received, and the processor may identify the second software module for processing the second data segment. The second software module may be transferred to the local memory in memory space formerly occupied by the first software module. The processor may then utilize the second software module to process the second data segment.

26 Claims, 5 Drawing Sheets

DYNAMIC MEMORY RECONFIGURATION FOR SIGNAL PROCESSING

CROSS-REFERENCE TO RELATED APPLICATIONS/INCORPORATION BY REFERENCE

This patent application is related to U.S. patent application Ser. No. 10/884,708 filed Jul. 2, 2004 and titled, "SCHEDULER FOR DYNAMIC CODE RECONFIGURATION".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In signal processing systems (e.g., real-time digital signal processing systems), processing time constraints are often strict. For example, in a real time audio decoding system, the system must often perform audio decoding processing at a rate at least as fast as the rate at which the encoded audio information is arriving at the system.

In a signal processing system that includes a processor, such as a digital signal processor, executing software or firmware instructions, the rate at which the processor can execute the software instructions may be limited by the time that it takes the processor to retrieve the software instructions from memory and otherwise exchange data with memory. Processors may generally interact with different types of memory at different rates. Often, the types of memory with which a processor may interface quickly are relatively costly and/or consume relatively large amounts of integrated circuit space.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide system and method for processing data (e.g., encoding audio data in an audio decoder) utilizing dynamic memory reconfiguration. Various aspects of the present invention may comprise a signal processing module and first memory module. The signal-processing module may, for example, comprise a processor and a second memory module (e.g., local memory). The first memory module may, for example, store information comprising a first software module and a second software module. The first and second software modules may, for example, be compiled and/or mapped to execute in overlapping instruction memory space.

A first data segment may be received, and the first software module may be identified (e.g. by the processor) for processing the first data segment. In an exemplary scenario, the first data segment may comprise encoded audio data, and the first software module may comprise instructions for decoding such encoded audio data.

The identified first software module may be transferred to the second memory module of the signal-processing module. One or more data tables may be identified (e.g., by the processor) to utilize with the first software module. An identified data table may be transferred to the second memory module (or a third memory module) of the signal-processing module. The processor may execute the first software module to process the first data segment, utilizing one or more data tables if necessary. Additionally, one or more additional software modules may be identified and loaded, along with corresponding data tables, to further process the first data segment.

A second data segment may be received, and the second software module may be identified (e.g., by the processor) for processing the second data segment. In an exemplary scenario, the second data segment may comprise encoded audio data, and the second software module may comprise instructions for decoding such encoded audio data.

The identified second software module may be transferred to the second memory module of the signal-processing module (e.g., in memory space formerly occupied by the first software module). One or more data tables may be identified (e.g., by the processor) to utilize with the second software module. An identified data table may be transferred to the second memory module (or a third memory module) of the signal-processing module. The processor may execute the second software module to process the second data segment, utilizing one or more data tables if necessary. Additionally, one or more additional software modules may be identified and loaded, along with corresponding data tables, to further process the second data segment.

These and other advantages, aspects and novel features of the present invention, as well as details of illustrative aspects thereof, will be more fully understood from the following description and drawings.

DETAILED DESCRIPTION OF THE INVENTION

Figure 1:
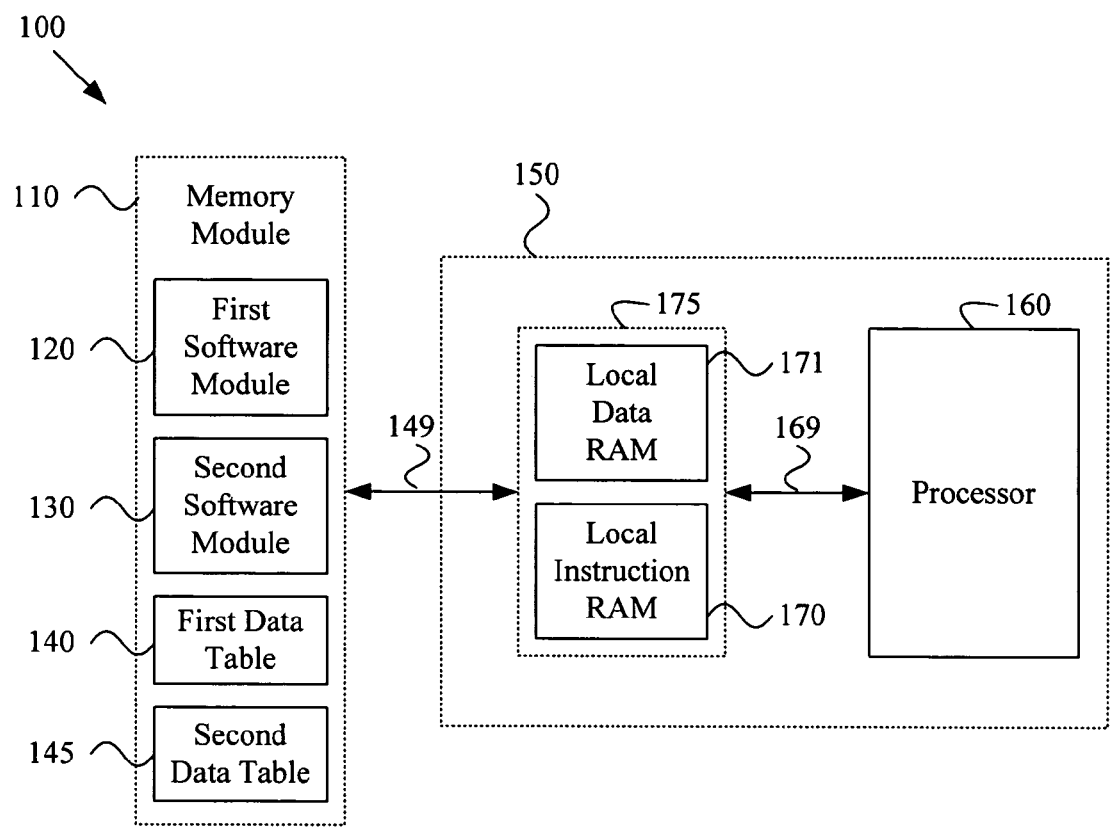
FIG. 1 is a diagram showing an exemplary system implementing dynamic memory reconfiguration for signal processing, in accordance with various aspects of the present invention.

FIG. 1 is a diagram showing an exemplary system 100 implementing dynamic memory reconfiguration for signal processing, in accordance with various aspects of the present invention. The exemplary system 100 may comprise a first memory module 110 and a signal-processing module 150. The signal-processing module 150 may be communicatively coupled to the first memory module 110 through a communication link 149. The communication link 149 may comprise characteristics of any of a large variety of communication link types. For example, the communication link 149 may comprise characteristics of a high-speed data bus capable of supporting direct memory access. The scope of various aspects of the present invention should not be limited by characteristics of a particular communication link type.

The first memory module 110 may comprise a first software module 120 and a second software module 130. The first software module 120 may, for example, comprise software instructions to perform any of a large variety of signal processing activities. For example and without limitation, the first software module 120 may comprise software instructions for decoding encoded data. Such software instructions may, for example, comprise software instructions for decoding encoded audio and/or video data. The scope of various aspects of the present invention should not be limited by characteristics of particular signal processing software.

The second software module 130 may, for example, comprise various characteristics of the first software module 120. However, the second software module 130 need not perform the same general functionality as the first software module 120. For example and without limitation, the second software module 130 may comprise software instructions to perform any of a large variety of signal processing activities. For example, the second software module 130 may comprise software instructions for decoding encoded data. Such instructions may, for example, comprise software instructions for decoding encoded audio and/or video data. As with the first software module 120, the scope of various aspects of the present invention should not be limited by characteristics of particular signal processing software.

In an exemplary scenario, the first software module 120 may comprise software instructions for performing a first type of audio data decoding (e.g., AC3 decoding), and the second software module 130 may comprise software instructions for performing a second type of audio data decoding (e.g., MPEG audio decoding). Note, however, that this configuration is merely exemplary and should in no way limit the scope of various aspects of the present invention.

The first software module 120 and the second software module 130 may, for example, comprise compiled software instructions. The first software module 120 may, for example, comprise software instructions compiled and mapped to execute in a first memory space, and the second software module 130 may comprise software instructions compiled and mapped to execute in a second memory space. For example and without limitation, the first memory space and the second memory space may substantially overlap. In an exemplary scenario, the first software module 120 may be compiled and mapped with a first base address, and the second software module 130 may be compiled and mapped with a second base address equal to the first base address. Note, however, that the scope of various aspects of the present invention should not be limited by characteristics of various memory mapping scenarios.

The first memory module 110 may comprise a first data table 140. The first data table 140 may, for example, comprise information utilized by the software instructions in the first software module 120 to perform various signal processing activities. The first memory module 110 may also, for example, comprise a second data table 145. The second data table 145 may, for example, comprise information utilized by the software instructions in the second software module 130 to perform various signal processing activities. Alternatively, for example, the second data table 145 may comprise information utilized by the software instructions in the first software module 120 in addition to information in the first data table 140.

In an exemplary scenario, the first data table 140 may comprise information utilized by the software instructions of the first software module 120 to decode a first type of encoded audio data (e.g., AAC encoding), and the second data table 145 may comprise information utilized by software instructions of the second software module 130 to decode a second type of encoded audio data (e.g., MP3 encoding). Alternatively, in an exemplary scenario, the first data table 140 may comprise information utilized by software instructions of the first software module 120 to perform a first stage of audio data decoding for a particular type of audio decoding, and the second data table 145 may comprise information utilized by software instructions of the first software module 120 to perform a second stage of audio data decoding for the particular type of audio decoding.

In general, the first data table 140 and the second data table 145 may comprise information utilized by the first software module 120 and/or second software module 130 to perform various signal processing activities. Accordingly, the scope of various aspects of the present invention should not be limited by characteristics of particular data or information that may reside in a data table.

As mentioned previously, the exemplary system 100 may also comprise a signal-processing module 150 that is communicatively coupled to the first memory module 110. The signal-processing module 150 may, for example and without limitation, reside on a different integrated circuit chip than the first memory module 110. Note, however, that the signal-processing module 150 is by no means required to reside on a different integrated circuit chip than the first memory module 110.

The signal-processing module 150 may comprise a processor 160 and a second memory module 170. The processor 160 may be communicatively coupled to the second memory module 170 through a second communication link 169. The second communication link 169 may comprise characteristics of any of a large variety of communication link types. For example, the communication link 169 may provide the processor 160 one-clock-cycle access to data (e.g., instruction data) stored in the second memory module 170. Note however, that the scope of various aspects of the present invention should not be limited by characteristics of a particular communication link type.

The processor 160 may, for example, comprise characteristics of any of a large number of processor circuits. For example and without limitation, the processor 160 may comprise characteristics of a general-purpose digital signal processor or microprocessor. The processor 160 may, for example, comprise characteristics of an application-specific integrated circuit processor. Accordingly, the scope of various aspects of the present invention should not be limited by characteristics of a particular processor.

The second memory module 170 may, for example, comprise characteristics of any of a large number of memory modules. For example and without limitation, the second memory module 170 may comprise random access memory (RAM). The second memory module 170 may, for example, comprise high-speed static RAM (SRAM). The second memory module 170 may, for example, comprise characteristics of dynamic RAM (DRAM) or any of a variety of volatile or non-volatile memory. Accordingly, the scope of various aspects of the present invention should not be limited by characteristics of a particular memory type.

In the exemplary system 100 illustrated in FIG. 1, the second memory module 170 may comprise RAM for storing software instructions for the processor 160 to execute. Accordingly, the following discussion may also refer to the second memory module 170 as local instruction RAM 170. This terminology, however, should not limit the scope of various aspects of the present invention.

The signal-processing module 150 may, for example, comprise a software control module. The software control module may, for example, comprise instructions that the processor 160 may execute to control loading and executing various software modules and data tables. Such a software control module may also be referred to as a "scheduler" in the following discussion. The software control module may, for example, comprise software or firmware instructions that the processor 160 executes. For example and without limitation, in a software implementation, the local instruction RAM 170 may, for example, comprise instructions of the software control module. Note, however, that the scope of various aspects of the present invention should not be limited by a particular implementation of a software control module (or scheduler).

During the performance of signal processing activities, the processor 160 (e.g., executing software control module instructions) may identify the first software module 120, stored in the first memory module 110, as being appropriate to utilize in processing a first data segment. The processor 160 may, for example, analyze characteristics of a data segment to make such a determination. Alternatively, the processor 160 may be informed of various characteristics of a data segment by another device. Such a determination may, for example, depend on a processing state in which the processor 160 is operating.

In an exemplary scenario, where the first data segment comprises audio data encoded according to MPEG encoding, and where the first software module 120 comprises software instructions that the processor 160 may execute to decode MPEG-encoded audio data, the processor 160 may determine that the processor 160 should execute software instructions in the first software module 120 to decode the data in the first data segment.

In general, the processor 160 may identify the first software module 120 as being appropriate to utilize (or execute) to process a particular data segment. Accordingly, the scope of various aspects of the present invention should not be limited by a particular manner in which the processor 160 may make such identification.

Once the processor 160 identifies the first software module 120 to execute to process the first data segment, the processor 160 (e.g., executing software control module instructions) may load the first software module 120 (e.g., a copy thereof) into the local instruction RAM 170. The processor 160 may, for example, load the first software module 120 into a first memory space of the local instruction RAM 170 beginning at a first memory address. The processor 160 may, for example, direct a direct memory access transfer of the first software module 120 of the first memory module 110 to the local instruction RAM 170. The following discussion will refer to the first software module 120 (or copy thereof) loaded into the local instruction RAM 170 as the "loaded first software module 120."

Once the processor 160 loads software instructions corresponding to the first software module 120 into the local instruction RAM 170, the processor 160 may execute the instructions of the loaded first software module 120 to process the first data segment. Continuing the exemplary scenario discussed previously, where the first data segment comprises MPEG-encoded audio data, the processor 160 may execute MPEG decoding instructions in the loaded first software module 120 to decode the encoded audio data in the first data segment.

The signal-processing module 150 may also, for example, comprise a third memory module 171. The third memory module 171 may, for example, comprise characteristics of any of a large number of memory modules. For example and without limitation, the third memory module 171 may comprise various aspects of the second memory module 170 discussed previously. Note, however, that the third memory module 171 need not exhibit the same characteristics as the second memory module 170. The third memory module 171 and the second memory module 170 may, for example, comprise respective portions of address space in a composite memory module 175. Alternatively, for example, the third memory module 171 and the second memory module 170 may reside on physically distinct memory modules.

For example and without limitation, the third memory module 171 may comprise random access memory (RAM). The third memory module 171 may, for example, comprise high-speed static RAM (SRAM). The third memory module 171 may, for example, comprise characteristics of dynamic RAM (DRAM) or any of a variety of volatile or non-volatile memory. Accordingly, the scope of various aspects of the present invention should not be limited by characteristics of a particular memory type or memory configuration of the third memory module 171 and/or the second memory module 170.

In the exemplary system 100 illustrated in FIG. 1, the third memory module 171 may comprise RAM that includes data space for the processor 160 to utilize during the execution of instructions. Accordingly, the following discussion may also refer to the third memory module 171 as local data RAM 171. This terminology, however, should not limit the scope of various aspects of the present invention.

The processor 160 (e.g., executing instructions in the loaded first software module 120 and/or the software control module) may identify the first data table 140 to utilize with the loaded first software module 120 to process the first data segment. The processor 160 may make such a determination or identification in any of a variety of ways. For example and without limitation, there may be a one-to-one correspondence between the first software module 120 and the first data table 140. Alternatively, for example, the first data table 140 may be utilized only during execution of a particular portion of the first software module 120 or under particular processing circumstances. Accordingly, the scope of various aspects of the present invention should not be limited by characteristics of any particular way in which the processor 160 identifies the first data table 140.

Once the processor 160 identifies the first data table 140 to utilize with the first software module 120 to process the first data segment, the processor 160 may, for example, direct the loading of the first data table 140 (e.g., a copy thereof) into the local data RAM 171. The processor 160 may, for example, play an active or passive roll in the loading process.

The processor 160 may, for example, load the first data table 140 into a first memory space of the local data RAM 171 beginning at a first memory address. The processor 160 may, for example, direct a direct memory access transfer of the information in the first data table 140 of the first memory module 110 to the local data RAM 171. The processor 160 may also, for example, direct the swapping of data between the first memory module 120 and the local data RAM 171. The following discussion will refer to the first data table 140 (or copy thereof) loaded into the local data RAM 171 as the "loaded first data table 140."

Once the processor 160 loads the first data table 140 into the local data RAM 171, the processor 160 may (e.g., while executing the loaded first software module 120) utilize the loaded first data table 140 to process the first data segment.

In an exemplary scenario, the processor 160, while processing the first data segment, may identify the second data table 145 to utilize with the loaded first software module 120 to process the first data segment. As mentioned previously with regard to the first data table 140, the processor 160 may make such a determination or identification in a variety of ways. As with the first data table 140, the processor 160 may then direct the loading of the second data table 145 (e.g., a copy thereof) into the local data RAM 171. The processor 160 may, for example, load the second data table 145 into substantially the same data space (e.g., beginning at the first memory address) of the local data RAM 171 as the processor 160 had previously loaded the first data table 140. Once the processor 160 loads the second data table 145 into the local data RAM 171, the processor 160 may (e.g., while executing the loaded first software module 120) utilize the loaded second data table 145 to process the first data segment.

During the performance of signal processing activities, the processor 160 (e.g., executing software control module instructions or the loaded first software module 120) may identify the second software module 130, stored in the first memory module 110, as being appropriate to utilize in processing a second data segment. The processor 160 may, for example and without limitation, identify the second software module 130 in a manner similar to the manner in which the processor 160 identified the first software module 120 for processing the first data segment.

The following discussion will discuss the processor 160 utilizing instructions of the second software module 130 to process a second data segment. Note, however, that the processor 160 may also have identified the second software module 130 to utilize to further process the first data segment. Accordingly, the scope of various aspects of the present invention should not be limited by the notion of a one-to-one correspondence of software module to data segment.

In an exemplary scenario, where the second data segment comprises audio data encoded according to AC3 encoding, and where the second software module 130 comprises software instructions that the processor 160 may execute to decode AC3 encoded audio data, the processor 160 may determine that the processor 160 should execute software instructions in the second software module 130 to decode the data in the second data segment.

In general, the processor 160 may identify the second software module 130 as being appropriate to utilize (or execute) to process a particular data segment. Accordingly, the scope of various aspects of the present invention should not be limited by a particular manner in which the processor 160 may make such identification.

Once the processor 160 identifies the second software module 130 to execute to process the second data segment, the processor 160 (e.g., executing software control module instructions or the loaded first software module 120) may load the second software module 130 (e.g., a copy thereof) into the local instruction RAM 170. The processor 160 may, for example, load the second software module 130 into a second memory space of the local instruction RAM 170 beginning at the first memory address. In other words, the processor 160 may load the second software module 130 at a memory space that starts at the same location as the first memory space into which the processor 160 loaded the first software module 120. Such software replacement, of course, may render the loaded first software module 120 non-executable.

Alternatively, for example, the processor 160 may load the second software module 130 at a second memory space that starts at a second memory address so that the second memory space does not overlap the first memory space. Such a software control strategy may, for example, allow the processor 160 to continue executing the loaded first software module 120 while the second software module 130 is being loaded.

The processor 160 may, for example, direct a direct memory access transfer of the second software module 130 of the first memory module 110 to the local instruction RAM 170. The following discussion will refer to the second software module 130 (or copy thereof) loaded into the local instruction RAM 170 as the "loaded second software module 130."

Once the processor 160 loads software instructions corresponding to the second software module 130 into the local instruction RAM 170, the processor 160 may execute the instructions of the loaded second software module 130 to process the second data segment. Continuing the exemplary scenario discussed previously, where the second data segment comprises AC3-encoded audio data, the processor 160 may execute AC3 decoding instructions in the loaded second software module 130 to decode the encoded audio data in the second data segment.

As discussed previously, the signal-processing module 150 may comprise a third memory module 171 (or local data RAM 171). The processor 160 (e.g., executing instructions in the loaded second software module 130 and/or the software control module) may identify the second data table 145 to utilize with the loaded second software module 130 to process the second data segment. The processor 160 may make such a determination or identification in any of a variety of ways. For example and without limitation, there may be a one-to-one correspondence between the second software module 130 and the second data table 145. Alternatively, for example, the second data table 145 may be utilized only during execution of a particular portion of the second software module 130 or under particular processing circumstances. Accordingly, the scope of various aspects of the present invention should not be limited by characteristics of any particular way in which the processor 160 identifies the second data table 145.

Once the processor 160 identifies the second data table 145 to utilize with the second software module 130 to process the second data segment, the processor 160 may, for example, direct the loading of the second data table 145 (e.g., a copy thereof) into the local data RAM 171. The processor 160 may, for example, play an active or passive roll in the loading process.

The processor 160 may, for example, load the second data table 145 into a second memory space of the local data RAM 171 beginning at a first memory address. In other words, the processor 160 may load the second data table 145 in a memory space that overlaps the memory space in which the processor 160 loaded the first data table 140, thus replacing at least a substantial portion of the loaded first data table 140 with the data from the second data table 145. Alternatively, for example, the processor 160 may load the second data table 145 into a second memory space that is separate from the memory space in which the processor 160 loaded the first data table 140.

The processor 160 may, for example, direct a direct memory access transfer of the information in the second data table 145 of the first memory module 110 to the local data RAM 171. The processor 160 may also, for example, direct the swapping of data between the first memory module 120 and the local data RAM 171. The following discussion will refer to the second data table 145 (or copy thereof) loaded into the local data RAM 171 as the "loaded second data table 145."

Once the processor 160 loads the second data table 145 into the local data RAM 171, the processor 160 may (e.g., while executing the loaded second software module 130) utilize the loaded second data table 145 to process the second data segment.

As discussed previously with regard to the processor 160 utilizing the first software module 120, first data table 140 and second data table 145, the processor 160 may utilize additional software modules and/or data tables to process the second data segment. Accordingly, the scope of various aspects of the present invention should not be limited by a notion of a one-to-one correspondence between software module, data table, and/or data segment.

Figure 2:
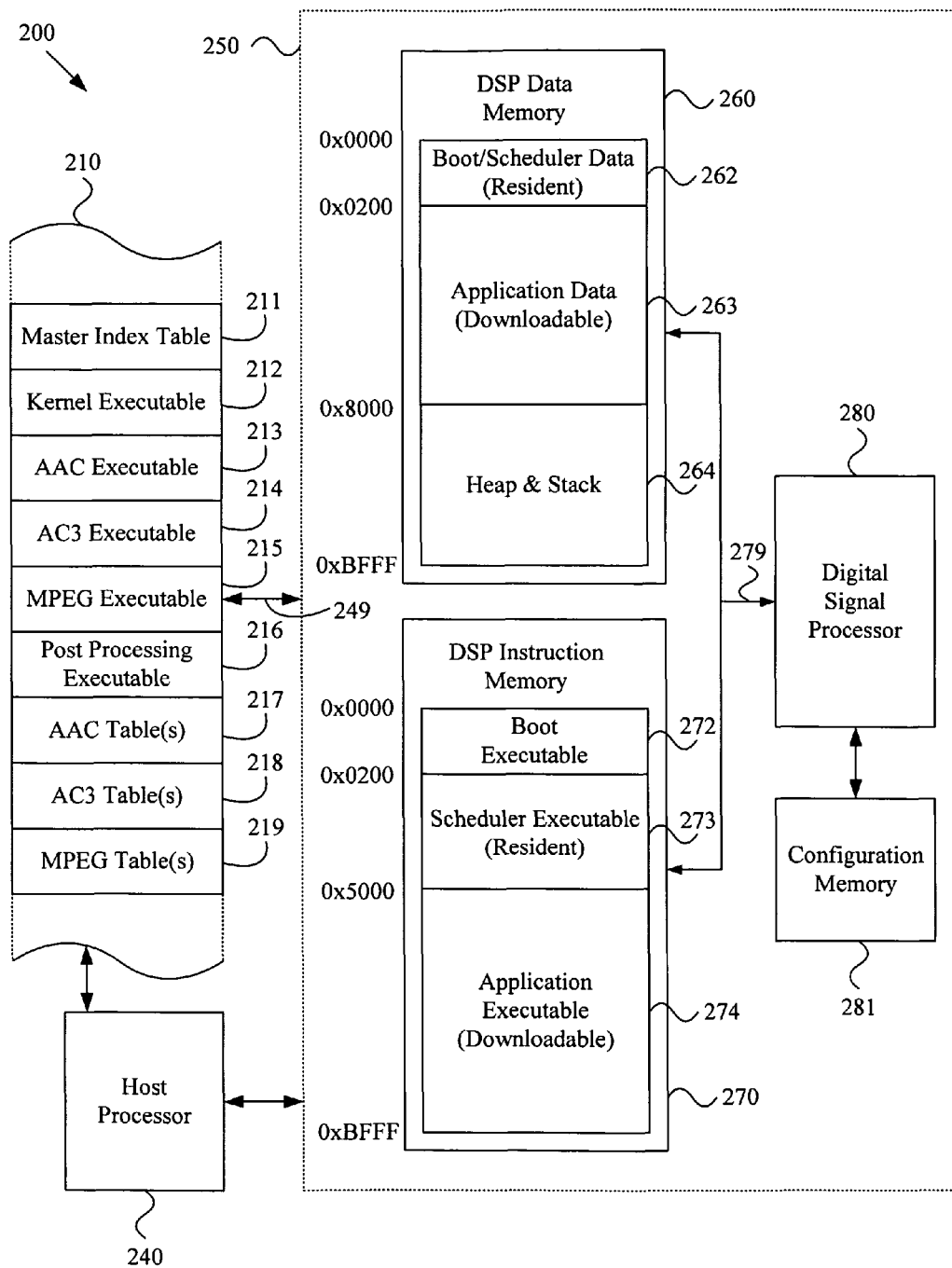
FIG. 2 is a diagram showing an exemplary system implementing dynamic memory reconfiguration for signal processing, in accordance with various aspects of the present invention.

FIG. 2 is a diagram showing an exemplary system 200 implementing dynamic memory reconfiguration for signal processing, in accordance with various aspects of the present invention. The exemplary system 200 comprises aspects of an audio decoding system, and the following discussion will focus on such aspects. However, the audio decoding system aspects are merely exemplary aspects and should by no means limit the scope of various aspects of the present invention to characteristics of an audio decoding system.

The exemplary system 200 may comprise a first memory module 210 and a signal-processing module 250. The signal-processing module 250 may be communicatively coupled to the first memory module 210 through a communication link 249. The communication link 249 may, for example, comprise various characteristics of the communication link 149 shown in the system 100 illustrated in FIG. 1 and discussed previously. However, the communication link 249 need not exhibit the same characteristics as the communication link 149. Accordingly, the scope of various aspects of the present invention should not be limited by characteristics of a particular communication link type.

The first memory module 210 may, for example, comprise software instructions and data for performing any of a large variety of signal processing activities. The first memory module 210 may, for example, comprise a master index table 211. The master index table 211 may, for example, comprise memory addresses of various software modules and data tables contained in the first memory module 210.

The first memory module 210 may also, for example, comprise a kernel executable 212 (or "kernel module") that may be utilized by the signal-processing module 250 to perform basic functionality. For example and without limitation, the kernel module 212 may comprise a boot module including software instructions that a processor may execute during the booting process, and a software control module (which may also be referred to herein as a "scheduler") that a processor may execute to manage software during signal processing activities.

The first memory module 210 may comprise a first software module 213, which in the exemplary system 200, may comprise a first software decoder module including software instructions for decoding AAC-encoded audio data. First memory module 210 may comprise a second software module 214, which in the exemplary system 200, may comprise a second software decoder module including software instructions for decoding AC3-encoded audio data. The first memory module 210 may, for example, further comprise a third software module 215, which in the exemplary system 200, may comprise a third software decoder module including software instructions for decoding MPEG-encoded audio data. The first memory module 210 may also, for example, comprise a fourth software module 216, which in the exemplary system 200, may comprise post-processing software instructions.

Note that any of the first, second, third and fourth software modules 213-216 may comprise internal modules (or sub-modules), which may, for example, be executed autonomously to perform a portion of data processing. For example and without limitation, the first software module 213 may comprise a first software module (or sub-module) that a processor may execute to perform a first portion of data processing on a data segment, and a second software module (or sub-module) that a processor may execute to perform a second portion of data processing on the data segment. Accordingly, the scope of various aspects of the present invention should not be limited by characteristics or notions of software module boundaries or sub-boundaries.

In general, the exemplary first memory module 210 may comprise software modules for performing any of a variety of signal processing activities (e.g., audio decoding operations). Accordingly, the scope of various aspects of the present invention should not be limited by characteristics of particular audio decoding software modules or sub-modules.

The first software module 213, second software module 214, third software module 215 and fourth software module 216 may, for example, comprise compiled software instructions. The first software module 213 may, for example, comprise software instructions compiled and mapped to execute in a first memory space, the second software module 214 may comprise software instructions compiled and mapped to execute in a second memory space, the third software module 215 may comprise software instructions compiled and mapped to execute in a third memory space, and the fourth software module 216 may comprise software instructions compiled and mapped to execute in a fourth memory space. For example and without limitation, the first, second, third and fourth memory spaces may substantially overlap. In an exemplary scenario, the first software module 213 may be compiled and mapped with a first base address, and the second, third and fourth software module 214-216 may be compiled and mapped with respective base addresses equal to the first base address.

In the exemplary system 200 illustrated in FIG. 2, the first, second, third and fourth software modules 213-216 may, for example, be compiled with base address 0x5000, which corresponds to the base address of the downloadable application space 274 of the second memory module 270, to be discussed later. Note, however, that the scope of various aspects of the present invention should not be limited by characteristics of various memory mapping scenarios.

The first memory module 210 may comprise a first data table(s) 217. The first data table(s) 217 may, for example, comprise data utilized by the software instructions in the first software module 213 to perform various signal processing activities. In the exemplary scenario where the first software module 213 comprises AAC decoding instructions, the first data table(s) 217 may comprise one or more data table(s) utilized by the instructions of the first software module 213 to decode AAC-encoded audio data.

The first memory module 210 may also, for example, comprise a second data table(s) 218. The second data table(s) 218 may, for example, comprise data utilized by the software instructions in the second software module 214 to perform various signal processing activities. In the exemplary scenario where the second software module 214 comprises AC3 decoding instructions, the second data table(s) 218 may comprise one or more data table(s) utilized by the instructions of the second software module 214 to decode AC3-encoded audio data.

The first memory module 210 may also, for example, comprise a third data table(s) 219. The third data table(s) 219 may, for example, comprise data utilized by the software instructions in the third software module 215 to perform various signal processing activities. In the exemplary scenario where the third software module 215 comprises MPEG audio decoding instructions, the third data table(s) 219 may comprise one or more data table(s) utilized by the instructions of the third software module 215 to decode MPEG-encoded audio data.

Though not illustrated in FIG. 2, the first memory module 210 may also, for example, comprise a data table(s) corresponding to the kernel module 212 and the fourth software module 216.

Note that any of the first, second, and third data tables 217-219 may comprise internal tables (or sub-tables), which may, for example, be utilized autonomously and/or sequentially to perform a portion of data processing. For example and without limitation, the first data table(s) 217 may comprise a first data table (or sub-table) that a processor may utilize to perform a first portion of data processing on a data segment, and a second data table (or sub-table) that a processor may utilize to perform a second portion of data processing on the data segment. Accordingly, the scope of various aspects of the present invention should not be limited by characteristics or notions of data table boundaries or sub-boundaries.

In general, the first, second and third data tables 217-219 may comprise data utilized by the first, second and third software modules 213-215 to perform various signal processing activities. Accordingly, the scope of various aspects of the present invention should not be limited by characteristics of particular data or information that may reside in a data table.

As mentioned previously, the exemplary system 200 may also comprise a signal-processing module 250 that is communicatively coupled to the first memory module 210. The signal-processing module 250 may, for example, share various characteristics with the signal-processing module 150 of the exemplary system 100 shown in FIG. 1 and discussed previously. However, the signal-processing module 250 need not exhibit the same characteristics as the signal-processing module 150.

The signal-processing module 250 may, for example and without limitation, reside on a different integrated circuit chip than the first memory module 210. The signal-processing module 250 may, for example, reside in a different integrated circuit package than the first memory module 210. Note, however, that the signal-processing module 250 is by no means required to reside on a different integrated circuit chip or package than the first memory module 210.

The signal-processing module 250 may comprise a processor 280 and a second memory module 270. The processor 280 may be communicatively coupled to the second memory module 270 through a second communication link 279. The second communication link 279 may, for example, share various characteristics with the communication link 169 of the exemplary system 100 illustrated in FIG. 1 and discussed previously. However, the second communication link 279 need not exhibit the same characteristics as the communication link 169. The second communication link 279 may comprise characteristics of any of a large variety of communication link types. For example, the communication link 279 may provide the processor 280 one-clock-cycle access to data (e.g., instruction data) stored in the second memory module 270. Note however, that the scope of various aspects of the present invention should not be limited by characteristics of a particular communication link type.

The processor 280 may, for example, comprise characteristics of any of a large number of processor circuits. For example and without limitation, the processor 280 may share various characteristics with the processor 160 of the exemplary system 100 illustrated in FIG. 1 and discussed previously. However, the processor 280 need not exhibit the same characteristics as the processor 160. For example, the processor 280 may comprise characteristics of a general-purpose digital signal processor, microprocessor or microcontroller. The processor 280 may, for example, comprise characteristics of an application-specific integrated circuit processor. Accordingly, the scope of various aspects of the present invention should not be limited by characteristics of a particular processor.

The second memory module 270 may, for example, comprise characteristics of any of a large number of memory modules. For example and without limitation, the second memory module 270 may share various characteristics with the second memory module 170 of the exemplary system 100 illustrated in FIG. 1 and discussed previously. However, the second memory module 270 need not exhibit the same characteristics as the second memory module 170. For example, the second memory module 270 may comprise RAM or high-speed SRAM. The second memory module 270 may, for example, comprise characteristics of any of a variety of volatile or non-volatile memory. Accordingly, the scope of various aspects of the present invention should not be limited by characteristics of a particular memory type.

In the exemplary system 200 illustrated in FIG. 2, the second memory module 270 may comprise RAM that includes software instructions for the processor 280 to execute. Accordingly, the following discussion may also refer to the second memory module 270 as local instruction RAM 270. This terminology, however, should not limit the scope of various aspects of the present invention.

The signal-processing module 250 may comprise a third memory module 260. For example and without limitation, the third memory module 260 may share various characteristics with the second memory module 270 discussed above or the third memory module 171 illustrated in FIG. 1 and discussed previously. However, the third memory module 260 need not exhibit the same characteristics as the third memory module 171 or second memory module 270. The third memory module 260 may, for example, comprise characteristics of any of a large number of memory modules. The third memory module 260 and the second memory module 270 may, for example, comprise respective portions of address space in a composite memory module. Alternatively, for example, the third memory module 260 and the second memory module 270 may reside on physically distinct memory modules. Accordingly, the scope of various aspects of the present invention should not be limited by characteristics of a particular memory type or memory configuration of the third memory module 260 and/or the second memory module 270.

In the exemplary system 200 illustrated in FIG. 2, the third memory module 260 may comprise RAM that includes data space for the processor 280 to utilize during the execution of instructions. Accordingly, the following discussion may also refer to the third memory module 260 as local data RAM 260. This terminology, however, should not limit the scope of various aspects of the present invention.

The exemplary system 200 may, for example, comprise a host processor 240. The host processor 240 may, for example, perform various processing activities related to the operation of the signal-processing module 250. For example and without limitation, the host processor 240 may manage various initialization activities for the signal-processing module 250, and may manage various data communication activities during operation of the signal-processing module 250.

In an exemplary scenario, the host processor 240 may initialize the signal-processing module 250 at start-up or system reset. The host processor 240 may, for example manage the transfer of the kernel module 212 from the first memory module 210 to the local instruction RAM 270 (e.g., at memory location 0x0000 of the local instruction RAM 270). As mentioned previously, the kernel module 212 may comprise a boot module and a scheduler module. In the exemplary scenario depicted in FIG. 2, the host processor 240 may manage the loading of the boot module of the kernel module 212 into boot executable memory space 272 of the second memory module 270, and manage the loading of the scheduler module into the scheduler executable memory space 273 of the second memory module 270.

The host processor 240 may also, for example, manage the loading of data corresponding to the boot module and scheduler module into the third memory module 260 (e.g., in the boot/scheduler data space 262 of the third memory module 260). The processor 280 may then utilize such data during execution of the boot module and the scheduler module from the second memory 270.

During the performance of signal processing activities, the processor 280 (e.g., executing software control module (or scheduler) instructions) may identify the first software module 213, stored in the first memory module 210, as being appropriate to utilize in processing a first data segment. The processor 280 may, for example, analyze characteristics of a data segment to make such a determination. Alternatively, the processor 280 may be informed of various characteristics of a data segment by another device (e.g., the host processor 240). Such a determination may, for example, depend on a processing state in which the processor 280 is operating.

In an exemplary scenario, where the first data segment comprises audio data encoded according to AAC encoding, and where the first software module 213 comprises software instructions that the processor 280 may execute to decode AAC-encoded audio data, the processor 280 may determine that the processor 280 should execute software instructions in the first software module 213 to decode the data in the first data segment.

In general, the processor 280 may identify the first software module 213 as being appropriate to utilize (or execute) to process a particular data segment. Accordingly, the scope of various aspects of the present invention should not be limited by a particular manner in which the processor 280 may make such identification.

Once the processor 280 identifies the first software module 213 to execute to process the first data segment, the processor 280 (e.g., executing the scheduler module instructions) may load the first software module 213 (e.g., a copy thereof) into the local instruction RAM 270. The processor 280 may, for example, load the first software module 213 into a first memory space (e.g., the application executable memory space 274) of the local instruction RAM 270 beginning at a first memory address (e.g., 0x5000 in the exemplary system 200). The processor 280 may, for example, manage a direct memory access transfer of the first software module 213 of the first memory module 210 to the local instruction RAM 270. The following discussion will refer to the first software module 213 (or copy thereof) loaded into the local instruction RAM 270 as the "loaded first software module 213."

Once the processor 280 loads software instructions corresponding to the first software module 213 into the local instruction RAM 270, the processor 280 may execute the instructions of the loaded first software module 213 to process the first data segment. Continuing the exemplary scenario discussed previously, where the first data segment comprises AAC-encoded audio data, the processor 280 may execute AAC decoding instructions in the loaded first software module 213 to decode the encoded audio data in the first data segment.

The processor 280 (e.g., executing instructions in the loaded first software module 213) may identify the first data table(s) 217 to utilize with the loaded first software module 213 to process the first data segment. The processor 280 may make such a determination or identification in any of a variety of ways. For example and without limitation, there may be a one-to-one correspondence between the first software module 213 and the first data table(s) 217. Alternatively, for example, the first data table(s) 217 (or portion thereof) may be utilized only during execution of a particular portion of the first software module 213 or under particular processing circumstances. Accordingly, the scope of various aspects of the present invention should not be limited by characteristics of any particular way in which the processor 280 identifies the first data table(s) 217.

Once the processor 280 identifies the first data table(s) 217 to utilize with the loaded first software module 213 to process the first data segment, the processor 280 may, for example, direct the loading of the first data table(s) 217 (or portion thereof) into the local data RAM 260. The processor 280 may, for example, load the first data table(s) 217 into a first memory space (e.g., the application data memory space 263) of the local data RAM 260 beginning at a first memory address (e.g., 0x0200 in the exemplary system 200). The processor 280 may, for example, direct a direct memory access transfer of the information (or portion thereof) in the first data table(s) 217 of the first memory module 210 to the application data memory space 263 of the local instruction RAM 260. The following discussion will refer to the first data table(s) 217 (or copy thereof) loaded into the local data RAM 260 as the "loaded first data table(s) 217."

Once the processor 280 loads the first data table(s) 217 into the local data RAM 260, the processor 280 may (e.g., while executing the loaded first software module 213) utilize the loaded first data table(s) 217 to process the first data segment.

The processor 280 may, for example, load and utilize a data table in portions. In an exemplary scenario, the processor 280, while processing the first data segment, may identify a second portion of the first data table(s) 217 to utilize with the loaded first software module 213 to further process the first data segment. As mentioned previously with regard to the first data table(s) 217, the processor 280 may make such a determination or identification in a variety of ways. As with the first data table(s) 217 (or a first portion thereof), the processor 280 may then direct the loading of the second portion of the first data table(s) 217 into the application data memory space 263 of the local data RAM 260.

The processor 280 may, for example, load the second portion of the first data table(s) 217 into substantially the same data space (e.g., beginning at the first memory address) of the local data RAM 260 as the processor 280 had previously loaded the first portion of the first data table(s) 217. Once the processor 280 loads the second portion of the first data table(s) 217 into the local data RAM 260, the processor 280 may (e.g., while executing the loaded first software module 213) utilize the loaded second portion of the first data table(s) 217 to process the first data segment.

During the performance of signal processing activities, the processor 280 (e.g., executing loaded scheduler module instructions) may identify the second software module 214, stored in the first memory module 210, as being appropriate to utilize in processing a second data segment. The processor 280 may, for example and without limitation, identify the second software module 214 in a manner similar to the manner in which the processor 280 identified the first software module 213 for processing the first data segment.

The following discussion will discuss the processor 280 utilizing instructions of the second software module 214 to process a second data segment. Note, however, that the processor 280 may also have identified a second portion of the first software module 213 or another related software module to utilize to further process the first data segment. Accordingly, the scope of various aspects of the present invention should not be limited by the notion of a one-to-one correspondence of software module to data segment.

In an exemplary scenario, where the second data segment comprises audio data encoded according to AC3 encoding, and where the second software module 214 comprises software instructions that the processor 280 may execute to decode AC3-encoded audio data, the processor 280 (e.g., executing scheduler module instructions) may determine that the processor 280 should execute AC3 decoding instructions in the second software module 214 to decode the AC3-encoded data in the second data segment.

In general, the processor 280 may identify the second software module 214 (or a portion thereof) as being appropriate to utilize (or execute) to process a particular data segment. As discussed previously with regard to the first software module 213, the processor 280 may make such identification in any of a variety of ways. Accordingly, the scope of various aspects of the present invention should not be limited by a particular manner in which the processor 280 may make such identification.

Once the processor 280 identifies the second software module 214 to execute to process the second data segment, the processor 280 (e.g., executing scheduler module instructions) may load the second software module 214 (e.g., a copy thereof) into the local instruction RAM 270. The processor 280 may, for example, load the second software module 214 into a second memory space of the local instruction RAM 270 beginning at the first memory address (e.g., at memory location 0x5000 in the exemplary system 200). In other words, the processor 280 may load the second software module 214 at a memory space that starts at the same location as the first memory space into which the processor 280 loaded the first software module 214. Such software replacement, of course, may render the loaded first software module 213 non-executable.

Alternatively, for example, the processor 280 may load the second software module 214 at a second memory space that starts at a second memory address so that the second memory space does not overlap the first memory space. Such a software control strategy may, for example, allow the processor 280 to continue executing the loaded first software module 213 while the second software module 214 is being loaded.

As with the first software module 213, the processor 280 may, for example, direct a direct memory access transfer of the information in the second software module 214 of the first memory module 210 to the application executable memory space 274 of the local instruction RAM 270. The following discussion will refer to the second software module 214 (or copy thereof) loaded into the local instruction RAM 270 as the "loaded second software module 214."

Once the processor 280 loads software instructions corresponding to the second software module 214 into the local instruction RAM 270, the processor 280 may execute the instructions of the loaded second software module 214 to process the second data segment. Continuing the exemplary scenario discussed previously, where the second data segment comprises AC3-encoded audio data, the processor 280 may execute AC3 decoding instructions in the loaded second software module 214 to decode the encoded audio data in the second data segment.

As discussed previously, the signal-processing module 250 may comprise a third memory module 260 (or local data RAM 260). The processor 280 (e.g., executing instructions in the loaded second software module 214) may identify the second data table(s) 218 (or portion thereof) to utilize with the loaded second software module 214 to process the second data segment. The processor 280 may make such a determination or identification in any of a variety of ways, as discussed previously with regard to the first data table(s) 217. Accordingly, the scope of various aspects of the present invention should not be limited by characteristics of any particular way in which the processor 280 identifies the second data table(s) 218.

Once the processor 280 identifies the second data table(s) 218 to utilize with the loaded second software module 214 to process the second data segment, the processor 280 may, for example, direct the loading of the second data table(s) 218 (or portion thereof) into the local data RAM 260.

The processor 280 may, for example, load the second data table(s) 218 (or portion thereof) into a second memory space of the local data RAM 260 beginning at the first memory address (e.g., at address 0x0200 in the exemplary system 200). In other words, the processor 280 may load the second data table(s) 218 in a memory space that overlaps the memory space in which the processor 280 loaded the first data table(s) 217, thus replacing at least a portion of the loaded first data table(s) 217 with the data from the second data table(s) 218. Alternatively, for example, the processor 280 may load the second data table(s) 218 into a second memory space that is separate from the memory space in which the processor 280 loaded the first data table(s) 217.

The processor 280 may, for example, direct a direct memory access transfer of the information in the second data table(s) 218 (or portion thereof) of the first memory module 210 to the application data memory space 263 of the local instruction RAM 260. The following discussion will refer to the second data table(s) 218 (or copy thereof) loaded into the local data RAM 260 as the "loaded second data table(s) 218."

Once the processor 160 loads the second data table(s) 218 into the local data RAM 260, the processor 280 may (e.g., while executing the loaded second software module 214) utilize the loaded second data table(s) 218 to process the second data segment.

As discussed previously with regard to the processor 280 utilizing the first software module 213 and the first data table(s) 217, the processor 280 may utilize additional software modules and/or data tables (or portions thereof) to process the second data segment. Accordingly, the scope of various aspects of the present invention should not be limited by a notion of a one-to-one correspondence between software module, data table, and/or data segment.

Figure 3:
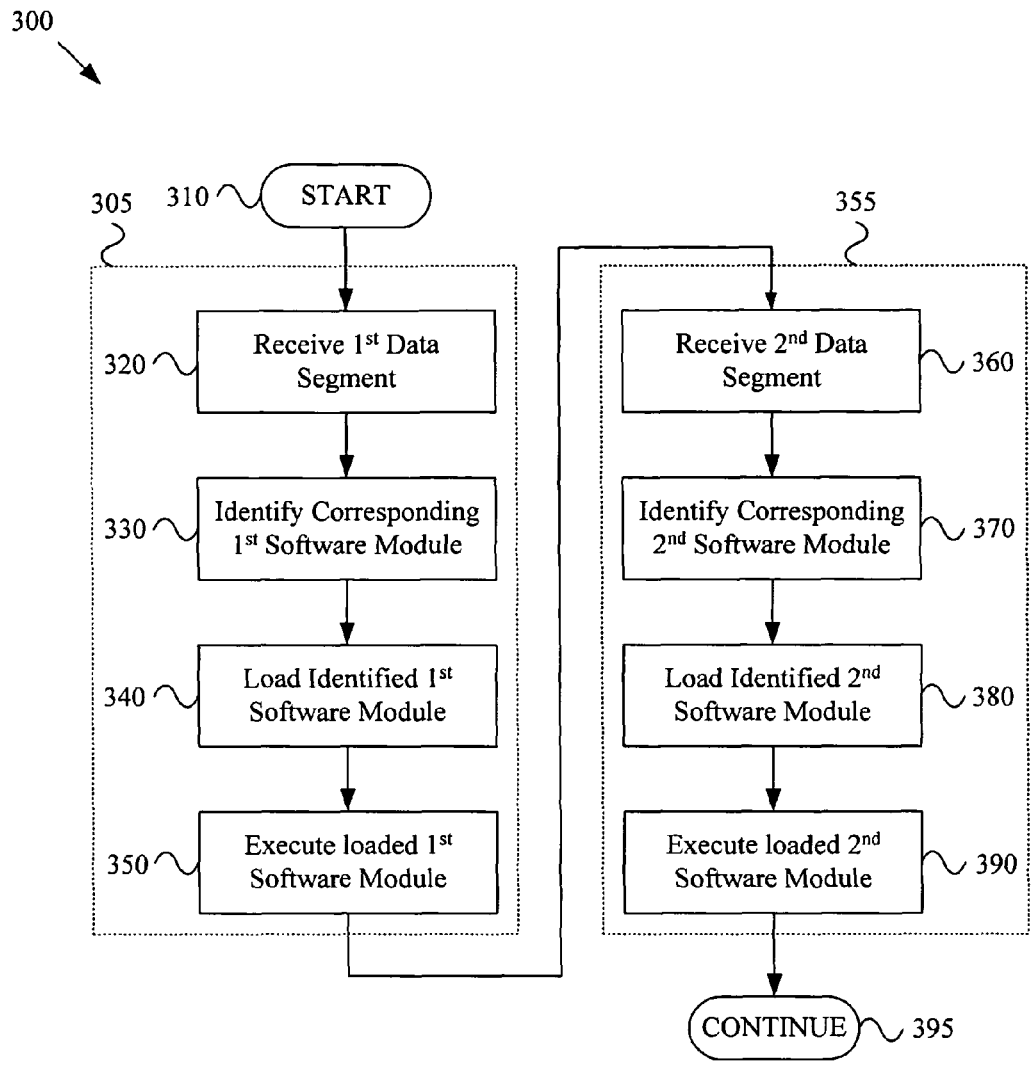
FIG. 3 is a diagram showing a method for implementing dynamic memory reconfiguration for signal processing, in accordance with various aspects of the present invention.

FIG. 3 is a diagram showing a method 300 for implementing dynamic memory reconfiguration for signal processing, in accordance with various aspects of the present invention.

The method 300 begins at step 310. Various events and conditions may cause the method 300 to begin. For example, a signal may arrive at a signal processor for processing. For example, in an exemplary audio decoding scenario, an encoded audio signal may arrive at an audio decoder for decoding. Generally, the method 300 may be initiated for a variety of reasons. Accordingly, the scope of various aspects of the present invention should not be limited by characteristics of particular initiating events or conditions.

The method 300, at step 320, may comprise receiving a first data segment. The first data segment may, for example, be received at a communication port or a processor register. The first data segment may, for example, be transferred to a signal-processing module in a data structure communicated to the signal-processing module from another module. The first data segment may, for example, be transferred to a signal-processing module by reference. Accordingly, the scope of various aspects of the present invention should not be limited by characteristics of how a signal processing system may receive information of a data segment.

The first data segment may, for example, comprise data to be processed by a signal-processing module implementing the method 300. The first data segment may, for example, comprise a frame (or plurality of frames) of encoded audio information. The first data segment may, for example, comprise a frame (or plurality of frames) of encoded video information. Accordingly, the scope of various aspects of the present invention should not be limited by characteristics of a particular data segment or by characteristics of a particular data type.

The method 300, at step 330, may comprise identifying a first software module to utilize to process the first data segment. Step 330 may comprise identifying the first software module in any of a variety of ways. For example and without limitation, step 330 may comprise identifying the first software module in ways discussed previously with regard to the processors 160, 280 of the exemplary systems 100, 200 illustrated in FIGS. 1-2 and discussed previously.

For example, step 330 may comprise identifying a first software module residing in a first memory module for execution by a processor to process the first data segment. In an exemplary scenario where the first data segment comprises audio data encoded according to AAC encoding, the identified first software module may comprise software instructions for decoding an AAC-encoded audio signal.

In general, step 330 may comprise identifying a first software module to utilize to process the first data segment. Accordingly, the scope of various aspects of the present invention should not be limited by characteristics of a particular way of identifying a software module or by characteristics of a software module.

The method 300, at step 340, may comprise transferring the first software module from a first memory module to a second memory module. Step 340 may, for example, comprise copying the first software module from the first memory module to the second memory module. For example and without limitation, step 340 may comprise transferring (or loading) the first software module in ways discussed previously with regard to the exemplary systems 100, 200 illustrated in FIGS. 1-2 and discussed previously. For example, step 340 may comprise transferring the first software module from a non-local memory to local memory. An exemplary local memory may, for example, be located on the same integrated circuit chip as a processor that will execute the first software module.

In general, step 340 may comprise transferring the identified first software module from a first memory module to a second memory module. Accordingly, the scope of various aspects of the present invention should not be limited by characteristics of a particular way of transferring a software module.

The method 300, at step 350, may comprise executing the first software module in the second memory module with a processor to process the first data segment. For example and without limitation, step 350 may comprise executing the first software module as discussed previously with regard to the exemplary systems 100, 200 illustrated in FIGS. 1-2.

Steps 320-350 may, for example, be combined in a first group of steps 305 for processing a first data segment. The grouping 305 is an exemplary grouping that will be referred to in subsequent discussion and should by no means limit the scope of various aspects of the present invention to characteristics of a particular grouping of steps.

The method 300, at step 360, may comprise receiving a second data segment. Step 360 may, for example, comprise receiving the second data segment in a manner similar to that discussed previously with regard to step 320. The second data segment may, for example, be received at a communication port or a processor register. The second data segment may, for example, be transferred to a signal-processing module in a data structure communicated to the signal-processing module from another module. The second data segment may, for example, be transferred to a signal-processing module by reference. Accordingly, the scope of various aspects of the present invention should not be limited by characteristics of how a signal processing system may receive information of a data segment.

The second data segment may, for example, comprise data to be processed by a signal-processing module implementing the method 300. The second data segment may, for example, comprise data similar to or different than the data in the first data segment. The second data segment may, for example, comprise a frame (or plurality of frames) of encoded audio information. Such encoded audio information may be encoded in a manner similar to or different than the manner in which information in the first data segment may have been encoded.

In an exemplary scenario, the second data segment may comprise AC3-encoded audio information, while the first data segment comprised AAC-encoded audio information. In general, the second data segment may, for example, comprise any of a large variety of data types. Accordingly, the scope of various aspects of the present invention should not be limited by characteristics of a particular data segment or by characteristics of a particular data type.

The method 300, at step 370, may comprise identifying a second software module to utilize to process the second data segment. Step 370 may, for example and without limitation, share various characteristics with step 330 discussed previously.

For example, step 370 may comprise identifying a second software module residing in a first memory module for execution by a processor to process the second data segment. In an exemplary scenario where the second data segment comprises audio data encoded according to AC3 encoding, the identified second software module may comprise software instructions for decoding an AC3-encoded audio signal.

In general, step 370 may comprise identifying a second software module to utilize to process the second data segment. Accordingly, the scope of various aspects of the present invention should not be limited by characteristics of a particular way of identifying a software module or by characteristics of a software module.

The method 300, at step 380, may comprise transferring the second software module from a first memory module to a second memory module. Step 380 may, for example and without limitation, share various characteristics with step 340 discussed previously.

Step 380 may, for example, comprise copying the second software module from the first memory module to the second memory module. For example and without limitation, step 380 may comprise transferring the second software module in ways discussed previously with regard to the exemplary systems 100, 200 illustrated in FIGS. 1-2. For example, step 380 may comprise transferring the second software module from a non-local memory to a local memory. An exemplary local memory may, for example, be located on the same integrated circuit chip as a processor that will execute the first software module.

Step 380 may, for example comprise transferring the second software module to the second memory module in substantially the same memory space as step 340 transferred the first software module. For example, step 380 may comprise loading the second software module beginning at the same base memory address in the second software module that step 340 began loading the first software module. In an exemplary scenario, the first and second software modules may each have been compiled and mapped to execute in substantially the same memory space.

In general, step 380 may comprise transferring the identified second software module from a first memory module to a second memory module. Accordingly, the scope of various aspects of the present invention should not be limited by characteristics of a particular way of transferring a software module.

The method 300, at step 390, may comprise executing the second software module in the second memory module with a processor to process the second data segment. Step 390 may, for example and without limitation, share various characteristics with step 350 discussed previously. Also, for example, step 390 may comprise executing the second software module as discussed previously with regard to the processors 160, 280 of the exemplary systems 100, 200 illustrated in FIGS. 1-2.

Steps 360-390 may, for example, be combined in a second group of steps 355 for processing a second data segment. The grouping 355 is an exemplary grouping that will be referred to in subsequent discussion, and should by no means limit the scope of various aspects of the present invention to characteristics of a particular grouping of steps.

The method 300, at step 395, may comprise performing continued processing. Such continued processing may, for example, comprise processing additional data segments utilizing a variety of software modules and corresponding processing data. Such continued processing may, for example and without limitation, comprise performing various additional processing as shown in the exemplary methods 400, 500 illustrated in FIGS. 4-5. In general step 395 may comprise performing continued processing, and accordingly, the scope of various aspects of the present invention should not be limited by particular continued processing activities.

Figure 4:
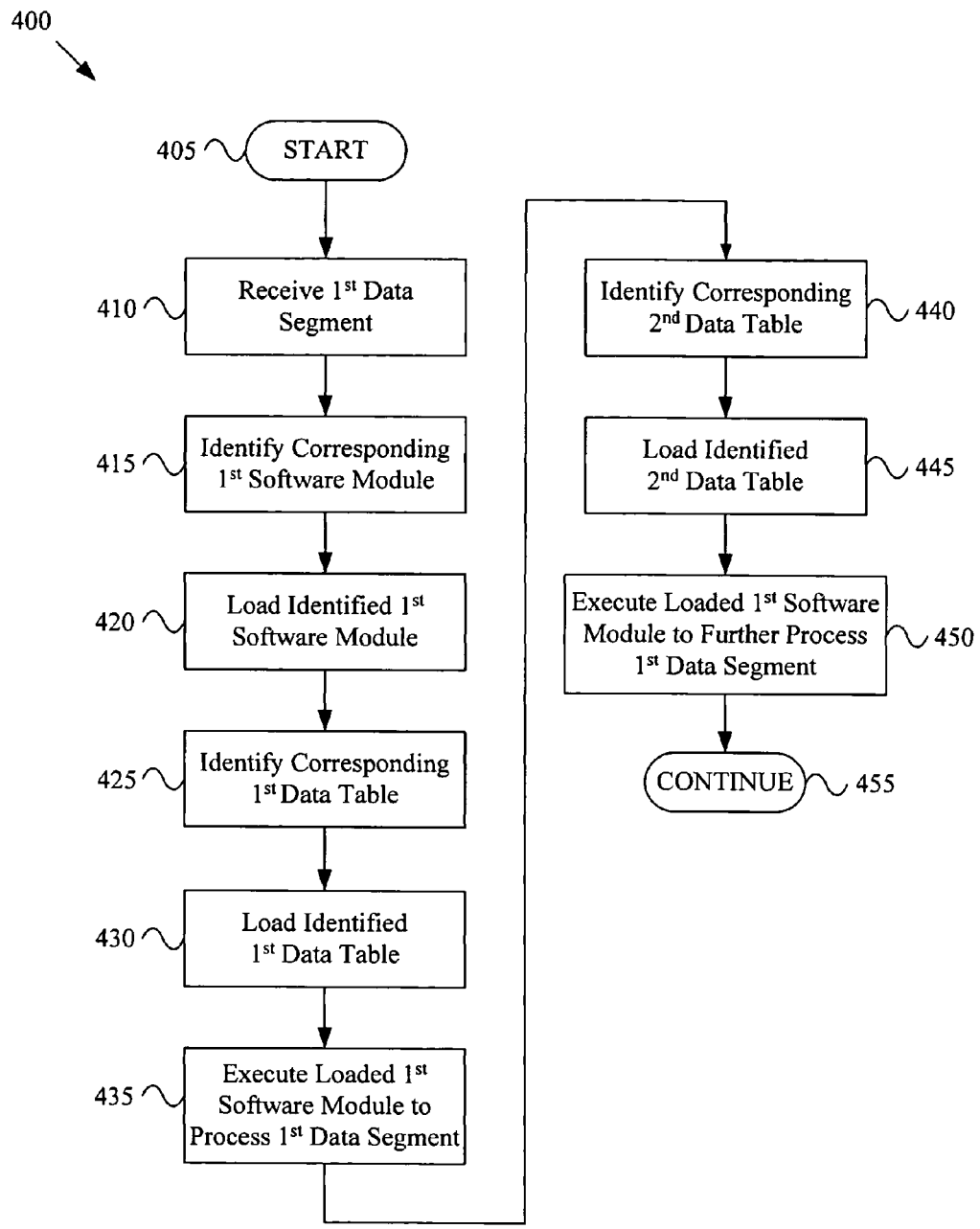
FIG. 4 is a diagram showing a method for implementing dynamic memory reconfiguration for signal processing, in accordance with various aspects of the present invention.

FIG. 4 is a diagram showing a method 400 for implementing dynamic memory reconfiguration for signal processing, in accordance with various aspects of the present invention. The exemplary method 400 generally illustrates implementing dynamic memory reconfiguration and processing for a data segment. Various aspects of the method 400 may, for example, be integrated into the method 300 discussed previously. For example and without limitation, various aspects of the method 400 may be substituted for various aspects of the first group of steps 315 and/or the second group of steps 355 of the method 300 illustrated in FIG. 3.

The method 400, at step 410, may comprise receiving a first data segment. The method 400, at step 415, may comprise identifying a first software module to utilize to process the first data segment. The method 400, at step 420, may comprise transferring the first software module from a first memory module to a second memory module. Steps 410, 415 and 420 may, for example and without limitation, comprise characteristics of method steps 320, 330 and 340 of the exemplary method 300 illustrated in FIG. 3 and discussed previously.

The method 400, at step 425, may comprise identifying a first data table to utilize with the first software module to process the first data segment. For example and without limitation, step 425 may comprise identifying a first data table as discussed previously with regard to the processors 160, 280 of the exemplary systems 100, 200 illustrated in FIGS. 1-2. The first data table may, for example, comprise information utilized by a processor executing the first software module to process the first data segment. In an exemplary scenario, where the first data segment comprises AAC-encoded audio data and the first software module comprises instructions to decode AAC-encoded audio data, the first data table may comprise data utilized by the first software module to decode AAC-encoded data.

In general, the first data table may comprise any information that may be utilized by the first software module. Accordingly, the scope of various aspects of the present invention should not be limited by characteristics of particular data or a particular data table.

The method 400, at step 430, may, for example, comprise transferring the first data table to a third memory module. Step 430 may, for example and without limitation, comprise transferring the first data table to a third memory module (e.g., loading the first data table on a local data RAM) as discussed previously with regard to the exemplary systems 100, 200 illustrated in FIGS. 1-2. Additionally, for example, step 430 may comprise transferring the first data table to a third memory module in a manner similar to the manner in which step 420 transferred the first software module to the second memory module.

In general, step 430 may comprise transferring the first data table to a third memory module. Accordingly, the scope of various aspects of the present invention should not be limited by characteristics of a particular way of transferring a data table.

The method 400, at step 435, may comprise executing the first software module (or a portion thereof) transferred at step 420 to process the first data segment. Step 435 may, for example, comprise utilizing information from the first data table transferred at step 430 to process the first data segment. Step 435 may, for example and without limitation, share various aspects with step 350 of the method 300 illustrated in FIG. 3 and discussed previously. Step 435 may, for example, comprise executing the first software module as discussed previously with regard to the exemplary systems 100, 200 illustrated in FIGS. 1-2.

The method 400, at step 440 may comprise identifying a second data table to utilize with the first software module to process the first data segment. For example and without limitation, step 440 may comprise identifying a second data table as discussed previously with regard to the processors 160, 280 of the exemplary systems 100, 200 illustrated in FIGS. 1-2. For example, step 440 may share various characteristics with step 425 discussed previously. The second data table may, for example, comprise information utilized by a processor executing the first software module to process the first data segment. The first software module may, for example, process the utilize information in the second data table to process the first data segment after the first software module utilizes information in the first data table to process the first data segment.

In an exemplary scenario, where the first data segment comprises AAC-encoded audio data and the first software module comprises instructions to decode AAC-encoded audio data, the first data table may comprise data utilized by the first software module to perform a first stage of decoding AAC-encoded data, and the second data table may comprise data utilized by the first software module to perform a second stage of decoding AAC-encoded data.

In general, the second data table may comprise any information that may be utilized by the first software module. Accordingly, the scope of various aspects of the present invention should not be limited by characteristics of particular data or a particular data table.

The method 400, at step 445, may comprise transferring (or loading) the second data table to a third memory module. Step 445 may, for example and without limitation, comprise transferring the second data table to a third memory module (e.g., loading the second data table on a local data RAM) as discussed previously with regard to the exemplary systems 100, 200 illustrated in FIGS. 1-2. Additionally, for example, step 445 may comprise transferring the first data table to a third memory module in a manner similar to the manner in which step 430 transferred the first data table to the third memory module.

Step 445 may, for example, comprise loading the second data table in the third memory module in substantially the same memory space that step 430 loaded the first data table. For example, step 430 may comprise loading the first data table in the third memory module beginning at a first base address, and step 445 may comprise loading the second data table in the third memory module beginning at the first base address. Alternatively, for example, step 445 may load the second data table in the third memory module in a different memory space than that in which step 430 loaded the first data table.

In general, step 445 may comprise transferring the second data table to a third memory module. Accordingly, the scope of various aspects of the present invention should not be limited by characteristics of a particular way of transferring a data table or a particular memory location to which a data table may be transferred.

The method 400, at step 450, may comprise executing the first software module (or a portion thereof) transferred at step 420 to process the first data segment. Step 450 may, for example, comprise utilizing information from the second data table transferred at step 445 to process the first data segment. Step 450 may, for example, share various aspects with step 435 discussed previously. Step 450 may, for example and without limitation, share various aspects with step 350 of the method 300 illustrated in FIG. 3 and discussed previously. Step 450 may, for example, comprise executing the first software module as discussed previously with regard to the exemplary systems 100, 200 illustrated in FIGS. 1-2.

In general, step 450 may comprise executing the first software module (or a portion thereof) to process the first data segment utilizing the second data table. Accordingly, the scope of various aspects of the present invention should not be limited by characteristics of a particular way of executing a software module or utilizing a data table during the execution of a software module.

The method 400, at step 455, may comprise performing further processing of the first data segment or additional data segments. Such further processing may, for example, comprise performing further processing of the first data segment by utilizing additional data tables and/or software modules. Such further processing may, for example, comprise processing a second data segment. Accordingly, the scope of various aspects of the present invention should not be limited by characteristics of further processing that may be performed on the first data segment or subsequent data segments.

Figure 5:
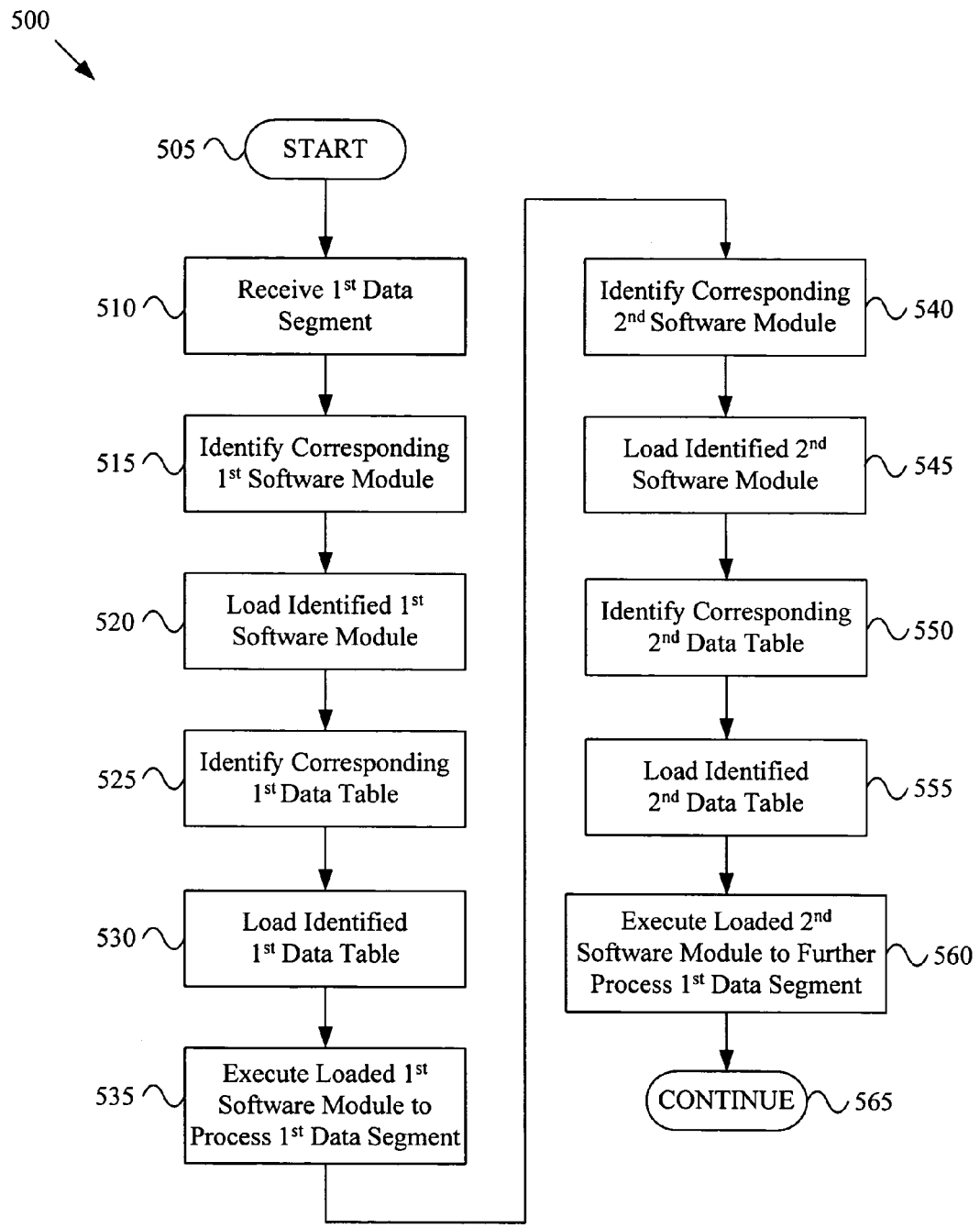
FIG. 5 is a diagram showing a method for implementing dynamic memory reconfiguration for signal processing, in accordance with various aspects of the present invention

FIG. 5 is a diagram showing a method 500 for implementing dynamic memory reconfiguration for signal processing, in accordance with various aspects of the present invention. The exemplary method 500 generally illustrates implementing dynamic memory reconfiguration and processing for a data segment. Various aspects of the method 500 may, for example, be integrated into the method 300 discussed previously. For example and without limitation, various aspects of the method 500 may be substituted for various aspects of the first group of steps 315 and/or the second group of steps 355 of the method 300 illustrated in FIG. 3.

The method 500, at step 510, may comprise receiving a first data segment. The method 500, at step 515, may comprise identifying a first software module to utilize to process the first data segment. The method 500, at step 520, may comprise transferring the first software module from a first memory module to a second memory module. The method 500, at step 525, may comprise identifying a first data table to utilize with the first software module to process the first data segment. The method 500, at step 530, may comprise transferring the identified first data table to a third memory module. The method 500, at step 535 may comprise executing the first software module and utilizing the first data table to process the first data segment. Steps 510, 515, 520, 525, 530 and 535 may, for example and without limitation, comprise characteristics of method steps 320, 330, 340 and 350 of the exemplary method 300 illustrated in FIG. 3 and discussed previously. Steps 510, 515, 520, 525, 530 and 535 may also, for example, share various characteristics with method steps 410, 415, 420, 425, 430 and 435 discussed previously.

The method 500, at step 540, may comprise identifying a second software module to utilize to process the first data segment. For example and without limitation, step 540 may comprise identifying a second software module as discussed previously with regard to the exemplary system 100, 200 illustrated in FIGS. 1-2 and discussed previously. For example, step 540 may share various characteristics with step 515 discussed previously.

In an exemplary scenario, where the first software module comprises instructions to decode AAC-encoded audio data in a data segment, the second software module may comprise instructions to perform a second portion of processing to decode AAC-encoded audio data in the data segment.

In general, the second software module may comprise instructions for utilization by a processor to perform further processing on the first data segment. Accordingly, the scope of various aspects of the present invention should not be limited by characteristics of a particular software module, including a particular division of functionality between various software modules that may be utilized to process the same data segment.

The method 500, at step 545, may comprise transferring the identified second software module to the second memory module. Step 545 may, for example and without limitation, comprise transferring the second software module to the second memory module (e.g., loading the second software module on a local instruction RAM) as discussed previously with regard to the exemplary systems 100, 200 illustrated in FIGS. 1-2. Also, for example, step 545 may comprise transferring the second software module to the second memory module in a manner similar to the manner in which step 520 transferred the first software module to the second memory module.

Step 545 may, for example, comprise loading the second software module in the second memory module in substantially the same memory space that step 520 loaded the first software module. For example, step 520 may comprise loading the first software module in the second memory module beginning at a first base address, and step 545 may comprise loading the second software module in the second memory module beginning at the first base address. Alternatively, for example, step 545 may load the second software module in the second memory module in a different memory space than that in which step 520 loaded the first software module.

In general, step 545 may comprise transferring the second software module to the second memory module. Accordingly, the scope of various aspects of the present invention should not be limited by characteristics of a particular way of transferring software instructions or a particular memory location to which software instructions may be transferred.

The method 500, at step 550 may comprise identifying a second data table to utilize with the second software module to process the first data segment. For example and without limitation, step 550 may comprise identifying a second data table as discussed previously with regard to the exemplary systems 100, 200 illustrated in FIGS. 1-2. For example, step 550 may share various characteristics with step 525 discussed previously. The second data table may, for example, comprise information utilized by a processor executing the second software module to process the first data segment. The second software module may, for example, utilize information in the second data table to process the first data segment after the first software module processes the first data segment.

In an exemplary scenario, where the first data segment comprises AAC-encoded audio data and the second software module comprises instructions to further decode AAC-encoded audio data, the second data table may comprise data utilized by the second software module to perform such further decoding of the AAC-encoded data. In general, the second data table may comprise any information that may be utilized by the second software module. Accordingly, the scope of various aspects of the present invention should not be limited by characteristics of a particular data table.

The method 500, at step 555, may comprise transferring (or loading) the second data table to a third memory module. Step 555 may, for example and without limitation, comprise transferring the second data table to a third memory module (e.g., loading the second data table on a local data RAM) as discussed previously with regard to the exemplary systems 100, 200 illustrated in FIGS. 1-2. Additionally, for example, step 555 may comprise transferring the second data table to the third memory module in a manner similar to the manner in which step 530 transferred the first data table to the third memory module.

Step 555 may, for example, comprise loading the second data table in the third memory module in substantially the same memory space that step 530 loaded the first data table. For example, step 530 may comprise loading the first data table in the third memory module beginning at a first base address, and step 555 may comprise loading the second data table in the third memory module beginning at the first base address. Alternatively, for example, step 555 may load the second data table in the third memory module in a different memory space than that in which step 530 loaded the first data table.

In general, step 555 may comprise transferring the second data table to a third memory module. Accordingly, the scope of various aspects of the present invention should not be limited by characteristics of a particular way of transferring a data table or a particular memory location to which a data table may be transferred.

The method 500, at step 560, may comprise executing the second software module (or a portion thereof) transferred at step 545 to process the first data segment. Step 560 may, for example, comprise utilizing information from the second data table transferred at step 555 to process the first data segment. Step 560 may, for example, share various aspects with step 535 discussed previously. Step 560 may, for example and without limitation, share various aspects with step 350 of the method 300 illustrated in FIG. 3 and discussed previously. Step 560 may, for example and without limitation, comprise executing the second software module as discussed previously with regard to the exemplary systems 100, 200 illustrated in FIGS. 1-2.

In general, step 560 may comprise executing the second software module (or a portion thereof) to process the first data segment utilizing the second data table. Accordingly, the scope of various aspects of the present invention should not be limited by characteristics of a particular way of executing a software module or utilizing a data table during the execution of a software module.

The method 500, at step 565, may comprise performing further processing of the first data segment or additional data segments. Such further processing may, for example, comprise performing further processing of the first data segment by utilizing additional software modules and data tables (e.g., executing a post-processing software module with associated data). Such further processing may, for example, comprise processing a second data segment. Accordingly, the scope of various aspects of the present invention should not be limited by characteristics of further processing that may be performed on the first data segment or subsequent data segments.

The exemplary methods 300, 400, 500 illustrated in FIGS. 3-5 and discussed previously may, for example, be implemented by a wide range of hardware, software, or a combination thereof. For example, various aspects of the methods 300, 400, 500 may be performed by a general-purpose processor or an application-specific processor executing software and/or firmware instructions. Also, for example, various aspects may be performed by discrete hardware. Accordingly, the scope of various aspects of the present invention should not be limited by a particular system configuration or implementation of any of the functionality previously discussed.

In summary, aspects of the present invention provide a system and method for performing data processing utilizing dynamic memory reconfiguration. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to any particular embodiment disclosed, but that the invention will include all embodiments falling within the scope of the appended claims.

What is claimed is:

1. A signal decoder comprising:
a first memory module comprising a first software decoder module and a second software decoder module; and
a signal processing module, communicatively coupled to the first memory module, wherein the signal processing module comprises:
a local memory module; and
a local processor, communicatively coupled to the local memory module, wherein the local processor:
identifies the first software decoder module;
loads the first software decoder module in the local memory module;
executes the loaded first software decoder module to process a first encoded data segment;
identifies the second software decoder module;

loads the second software decoder module in the local memory module at a memory location substantially occupied by the loaded first software decoder module; and
executes the loaded second software decoder module to process a second encoded data segment.

2. The signal decoder of claim 1, wherein the first encoded data segment comprises encoded audio data, and the first software decoder module comprises software instructions to decode the encoded audio data.

3. The signal decoder of claim 1, wherein the local processor and the local memory module are integrated into a single semiconductor chip.

4. A signal decoder comprising:
a first memory module comprising a first software decoder module and a second software decoder module; and
a signal processing module, communicatively coupled to the first memory module, wherein the signal processing module comprises:
a local memory module; and
a local processor, communicatively coupled to the local memory module, wherein the local processor:
identifies the first software decoder module;
loads the first software decoder module in the local memory module;
executes the loaded first software decoder module to process a first encoded data segment;
identifies a first data table to utilize with the first software decoder module to decode the first encoded data segment;
loads the first data table in the local memory module;
executes the loaded first software decoder module to process the first encoded data segment utilizing the loaded first data table;
identifies a second data table to utilize with the first software decoder module to decode the first encoded data segment;
loads the second data table in the local memory module at a memory location substantially occupied by the loaded first data table; and
executes the loaded first software decoder module to process the first encoded data segment utilizing the loaded second data table.

5. A signal decoder comprising:
a first memory module comprising a first software decoder module and a second software decoder module, wherein the first software decoder module comprises software instructions mapped to execute in a first memory space of the local memory module, and the second software decoder module comprises software instructions mapped to execute in a second memory space of the local memory module that comprises at least a portion of the first memory space; and
a signal processing module, communicatively coupled to the first memory module, wherein the signal processing module comprises:
a local memory module; and
a local processor, communicatively coupled to the local memory module, wherein the local processor:
identifies the first software decoder module;
loads the first software decoder module in the local memory module; and
executes the loaded first software decoder module to process a first encoded data segment.

6. A signal decoder comprising:
a first memory module comprising a first software decoder module and a second software decoder module; and
a signal processing module, communicatively coupled to the first memory module, wherein the signal processing module comprises:
a local memory module; and
a local processor, communicatively coupled to the local memory module, wherein the local processor:
identifies the first software decoder module;
loads the first software decoder module in the local memory module;
executes the loaded first software decoder module to process a first encoded data segment;
identifies the second software decoder module;
loads the second software decoder module in the local memory module at a memory location substantially occupied by the loaded first software decoder module; and
executes the loaded second software decoder module to process the first encoded data segment.

7. A system for processing data, the system comprising:
a first memory module comprising a first software module and a second software module; and
a signal processing module, communicatively coupled to the first memory module, wherein the signal processing module comprises:
a second memory module; and
a processor, communicatively coupled to the second memory module, wherein the processor:
identifies the first software module;
loads the first software module in the second memory module;
executes the loaded first software module to process a first data segment;
identifies the second software module;
loads the second software module in the second memory module at a memory location substantially occupied by the loaded first software module; and
executes the loaded second software module to process a second data segment.

8. The system of claim 7, wherein the first data segment comprises encoded data, and the first software module comprises decoding instructions.

9. The system of claim 7, wherein the processor and second memory module are integrated on a single semiconductor chip.

10. The system of claim 7, wherein the signal-processing module further comprises a third memory module, and the processor:
identifies a first data table to utilize with the first software module to process the first data segment;
loads the first data table in the third memory module; and
utilizes the first data table with the first software module to process the first data segment.

11. The system of claim 10, wherein the processor:
identifies a second data table to utilize with the first software module to process the first data segment;
loads the second data table in the third memory module at a memory location substantially occupied by the first data table; and
utilizes the second data table with the first software module to process the first data segment.

12. The system of claim 7, wherein the first software module comprises software instructions mapped to execute in a first memory space, and the second software module comprises software instructions mapped to execute in a second memory space that comprises at least a portion of the first memory space.

13. The system of claim 7, wherein the processor:
- identifies a third software module to utilize to process the first data segment;
- loads the third software module in the second memory module at a memory location substantially occupied by the first software module; and
- executes the third software module to process the first data segment.

14. In a signal processor with local memory, a method for processing encoded data, the method comprising:
- receiving a first encoded data segment;
- identifying a first software module to utilize to decode the first encoded data segment;
- loading the first software module in the local memory;
- executing the first software module in the local memory with the signal processor to decode the first data segment;
- receiving a second encoded data segment;
- identifying a second software module to utilize to decode the second encoded data segment;
- loading the second software module in the local memory at a memory location substantially occupied by the first software module; and
- executing the second software module in the local memory with the signal processor to decode the first data segment.

15. The method of claim 14, wherein the first encoded data segment comprises encoded audio data, and the first software module comprises software instructions to decode the encoded audio data.

16. The method of claim 14, wherein the signal processor and local memory are integrated on the same semiconductor chip.

17. In a signal processor with local memory, a method for processing encoded data, the method comprising:
- receiving a first encoded data segment;
- identifying a first software module to utilize to decode the first encoded data segment;
- loading the first software module in the local memory; and
- executing the first software module in the local memory with the signal processor to decode the first data segment;
- identifying a first data table to utilize with the first software module to decode the first encoded data segment;
- loading the first data table in the local memory; and
- utilizing the first data table with the first software module to process the first encoded data segment;
- identifying a second data table to utilize with the first software module to process the first encoded data segment;
- loading the second data table in the local memory at a memory location substantially occupied by the first data table; and
- utilizing the second data table with the first software module to process the first data segment.

18. In a signal processor with local memory, a method for processing encoded data, the method comprising:
- receiving a first encoded data segment;
- identifying a first software module to utilize to decode the first encoded data segment, wherein the first software module comprises software instructions mapped to execute in a first memory space in local memory, and a second software module comprises software instructions mapped to execute in a second memory space in local memory that comprises at least a portion of the first memory space;
- loading the first software module in the local memory; and
- executing the first software module in the local memory with the signal processor to decode the first data segment.

19. In a signal processor with local memory, a method for processing encoded data, the method comprising:
- receiving a first encoded data segment;
- identifying a first software module to utilize to decode the first encoded data segment;
- loading the first software module in the local memory;
- executing the first software module in the local memory with the signal processor to decode the first data segment;
- identifying a second software module to utilize to process the first data segment;
- loading the second software module in the local memory at a memory location substantially occupied by the first software module; and
- executing the second software module with the signal processor to decode the first data segment.

20. A method for processing data, the method comprising:
- receiving a first data segment;
- identifying a first software module to utilize to process the first data segment;
- transferring the first software module from a first memory module to a second memory module;
- executing the first software module in the second memory module with a processor to process the first data segment;
- receiving a second data segment;
- identifying a second software module to utilize to process the second data segment;
- transferring the second software module from the first memory module to the second memory module at a memory location substantially occupied by the first software module; and
- executing the second software module with the processor to process the second data segment.

21. The method of claim 20, wherein the first data segment comprises encoded data, and the first software module comprises decoding instructions.

22. The method of claim 20, wherein the second memory module is located on the same integrated circuit chip as the processor, and the first memory module is not located on the same integrated circuit chip as the processor.

23. The method of claim 20, further comprising:
- identifying a first data table to utilize with the first software module to process the first data segment;
- transferring the first data table to a third memory module; and
- utilizing the first data table with the first software module to process the first data segment.

24. The method of claim 23, further comprising:
- identifying a second data table to utilize with the first software module to process the first data segment;
- transferring the second data table to the third memory module at a memory location substantially occupied by the first data table; and
- utilizing the second data table with the first software module to process the first data segment.

25. The method of claim 20, wherein the first software module comprises software instructions mapped to execute in a first memory space, and the second software module comprises software instructions mapped to execute in a second memory space that comprises at least a portion of the first memory space.

26. The method of claim 20, further comprising, prior to processing the second data segment:
- identifying a third software module to utilize to process the first data segment;

transferring the third software module from the first memory module to the second memory module at a memory location substantially occupied by the first software module; and executing the third software module with the processor to process the first data segment.

* * * * *